(12) United States Patent
Devassykutty et al.

(10) Patent No.: US 9,807,463 B2
(45) Date of Patent: Oct. 31, 2017

(54) UNIFIED MEDIA PROGRAM GUIDE SYSTEMS AND METHODS

(71) Applicant: Verizon Patent and Licensing Inc., Arlington, VA (US)

(72) Inventors: Benny Devassykutty, Lewisville, TX (US); Heath Stallings, Colleyville, TX (US); Daniel S. Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 14/145,566

(22) Filed: Dec. 31, 2013

(65) Prior Publication Data

US 2015/0189388 A1 Jul. 2, 2015

(51) Int. Cl.
*H04N 7/10* (2006.01)
*H04N 21/482* (2011.01)
*H04N 21/472* (2011.01)

(52) U.S. Cl.
CPC ... *H04N 21/4821* (2013.01); *H04N 21/47202* (2013.01)

(58) Field of Classification Search
CPC .......... H04N 21/482; H04N 21/4532

USPC ................... 725/32, 39–44, 46, 52
See application file for complete search history.

(56) References Cited

U.S. PATENT DOCUMENTS

| | | | |
|---|---|---|---|
| 2007/0300256 A1* | 12/2007 | Coomer | H04N 5/44543 725/44 |
| 2010/0333139 A1* | 12/2010 | Busse | H04N 5/44543 725/44 |
| 2012/0174039 A1* | 7/2012 | Rhoads et al. | 715/854 |
| 2013/0174200 A1* | 7/2013 | Sinha et al. | 725/40 |
| 2013/0339998 A1* | 12/2013 | Arme | H04N 21/4668 725/32 |

* cited by examiner

*Primary Examiner* — Jivka Rabovianski

(57) ABSTRACT

An exemplary method includes a media program guide system 1) providing, for display on a display screen, a media program guide user interface that includes a grid of cells representing scheduled-type media content and on-demand-type media content, and a selector window positioned relative to the grid of cells to select a cell included in the grid of cells, and 2) selectively configuring a feature of the selector window based on whether the cell selected by the selector window represents the scheduled-type media content or the on-demand-type media content. Corresponding systems and methods are also described.

23 Claims, 16 Drawing Sheets

UNIFIED MEDIA PROGRAM GUIDE SYSTEMS AND METHODS

BACKGROUND INFORMATION

Options for accessing and experiencing media programs such as television programs have increased substantially in recent years. For example, users of consumer electronic devices may access and experience television programs as the television programs are transmitted live in accordance with a television transmission schedule over the air, the Internet, and cable and satellite television networks.

Users may also access and experience television programs at their convenience, independent of television transmission schedules. For example, users may download and/or stream television programs on-demand over the Internet.

Conventional user interfaces configured for use by users to discover, access, and experience media programs such as television programs are typically as disparate and/or independent as are the different options for accessing and experiencing the media programs. In a typical example, one user interface is dedicated for use by users to discover, access, and experience live transmissions of television programs in accordance with a live transmission schedule and another user interface is dedicated for use by users to locate, access, and experience on-demand television programs.

Such user interfaces are conventionally separate one from another and/or have unique or otherwise different characteristics, such as different visual layouts, navigation tools, navigation flows, organizations, and/or theories of operation. Moreover, the user interfaces may operate independently and may require that users return to a high-level within a navigation flow in order to switch from one user interface to another. To illustrate, a user using a user interface to locate live transmissions of television programs may be required to entirely leave that user interface (and its characteristics) in order to access any information about on-demand television programs in an entirely separate user interface (that has its own characteristics).

Such an inconvenient user interface navigation flow may make it difficult for users to access all of the information about media content options available to them and/or to make optimal choices regarding media programs they access and experience. For example, a user using one user interface may be unaware of the availability of a television program that is accessible through another user interface, which is reachable only through an inconvenient user interface navigation flow.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
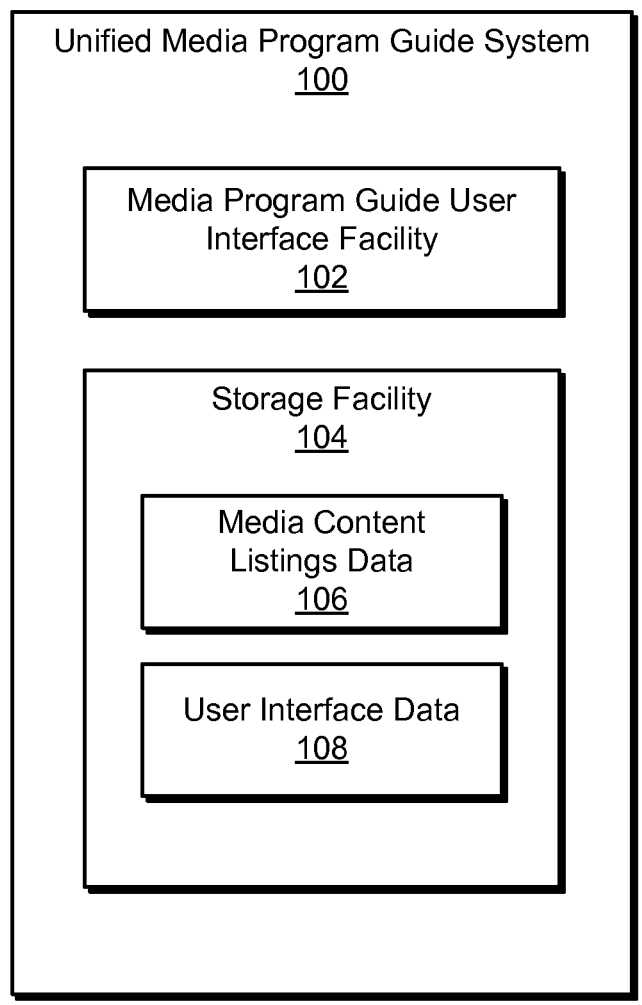
FIG. 1 illustrates an exemplary unified media program guide system according to principles described herein.

Exemplary unified media program guide systems and methods are described herein. The exemplary systems and methods may provide, in a graphical user interface, a unified media program guide that represents media content of different types. For example, the unified media program guide may represent both scheduled, linear-type media content ("scheduled-type media content") and on-demand, non-linear-type media content ("on-demand-type media content").

As used herein, the term "media content" may refer to any form of media that may be processed by a consumer electronics device for presentation to a user of the device. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may experience with a consumer electronics device. Such media programs may be accessed and/or processed (e.g., played back) by an appropriately configured consumer electronics device such as user computing device (e.g., a media player device) for presentation to the user.

As used herein, "scheduled-type media content" refers to media content that is scheduled for transmission in accordance with a media content transmission schedule defined by a media content service provider and/or another entity different from a user accessing the media content. For example, scheduled-type media content may include television programs scheduled for live transmission (e.g., broadcast, multicast, or other live transmission) in accordance with a television transmission schedule.

As used herein, "on-demand-type media content" refers to media content that is accessible by a user on-demand (e.g., independent of a media content transmission schedule defined by a media content service provider). The on-demand-type media content may be accessible by the user from any suitable source. For example, on-demand-type media content may include television programs in a video-on-demand library that are available for on-demand access by the user by way of a media-on-demand service. Additionally or alternatively, on-demand-type media content may include television programs recorded by a network digital video recording ("DVR") device and/or by a user DVR device (e.g., a DVR device located at a premises of the user).

The exemplary systems and methods described herein may selectively configure one or more features of the unified media program guide based on which type of media content is currently selected in the unified media program guide. For example, the unified media program guide may include a grid of cells representing scheduled-type media content and on-demand-type media content, and a multi-function cell selector window ("selector window") positioned relative to the grid of cells to select a cell included in the grid of cells. The exemplary systems and methods described herein may selectively configure at least one feature of the media program guide (e.g., at least one feature of the selector window) based on whether the cell selected by the selector window represents the scheduled-type media content or the on-demand-type media content. Examples of how the media program guide may be selectively configured based on whether the cell selected by the selector window represents the scheduled-type media content or the on-demand-type media content are described herein.

The exemplary unified media program guide systems and methods described herein may represent different types of media content in a unified media program guide user interface in a manner that facilitates intuitive and/or convenient user discovery of and/or access to media content of different types within the media program guide. Accordingly, a user may have intuitive and/or convenient access to information about the different types of media content within the unified media program guide user interface, without having to leave the unified media program guide user interface to access a separate user interface. These and/or other benefits or advantages of the exemplary systems and methods will be made apparent herein. Exemplary unified media program guide systems, methods, and devices will now be described in reference to the drawings.

FIG. 1 illustrates an exemplary unified media program guide system 100 ("system 100"). As shown, system 100 may include, without limitation, a media program guide user interface facility 102 ("program guide facility 102") and a storage facility 104 selectively and communicatively coupled to one another. Any suitable communication technologies, including any of the communication technologies mentioned herein, may be employed to facilitate communications between facilities 102-104.

Although facilities 102-104 are shown to be discrete facilities in FIG. 1, any of facilities 102-104 may be combined into fewer facilities, such as into a single facility, or divided into more facilities as may serve a particular implementation. Additionally or alternatively, one or more of the facilities 102-104 may be omitted from and external to system 100 in other implementations. For example, storage facility 104 may be external of and communicatively coupled to system 100 in certain alternative implementations. Facilities 102-104 will now be described in more detail.

Storage facility 104 may be configured to store media program listings data 106 representative of one or more media program listings, which may include information about media programs that are accessible to a user. For example, media program listings may include information about scheduled-type media programs (e.g., media programs scheduled for distribution in accordance with a media program transmission schedule) and on-demand-type media programs (e.g., media programs included in an on-demand media content repository associated with a media-on-demand service and/or a DVR device). Media program listings data 106 may include any media program listings data accessed by and/or accessible to program guide facility 102 from any suitable source or sources (e.g., from a unified source data set or separate source data sets). Storage facility 104 may be further configured to store user interface data 108, which may include any data used and/or generated by program guide facility 102 to provide a unified media program guide user interface. Storage facility 104 may maintain additional or alternative data as may serve a particular implementation.

Program guide facility 102 may provide a media program guide user interface for display on a display screen. Program guide facility 102 may be configured to provide the media program guide user interface for display on the display screen in any suitable way. For example, program guide facility 102 may transmit data representative of the media program guide user interface to a user computing device and/or a component (e.g., a graphics engine, a device output interface, etc.) of a user computing device for processing to display the media program guide user interface on a display screen associated with (e.g., integrated within or communicatively connected to the user computing device). A user computing device may include any computing device associated with (e.g., operated by) a user who may view and/or interact with the media program guide user interface (e.g., an end user of a media service associated with the media program guide user interface).

The media program guide user interface provided by program guide facility 102 for display on a display screen may include user interface content representative of a unified media program guide. The media program guide may be unified in that the media program guide may be configured to represent media content of different types, such as scheduled-type media content and on-demand-type media content, in a view of the media program guide.

Figure 2:
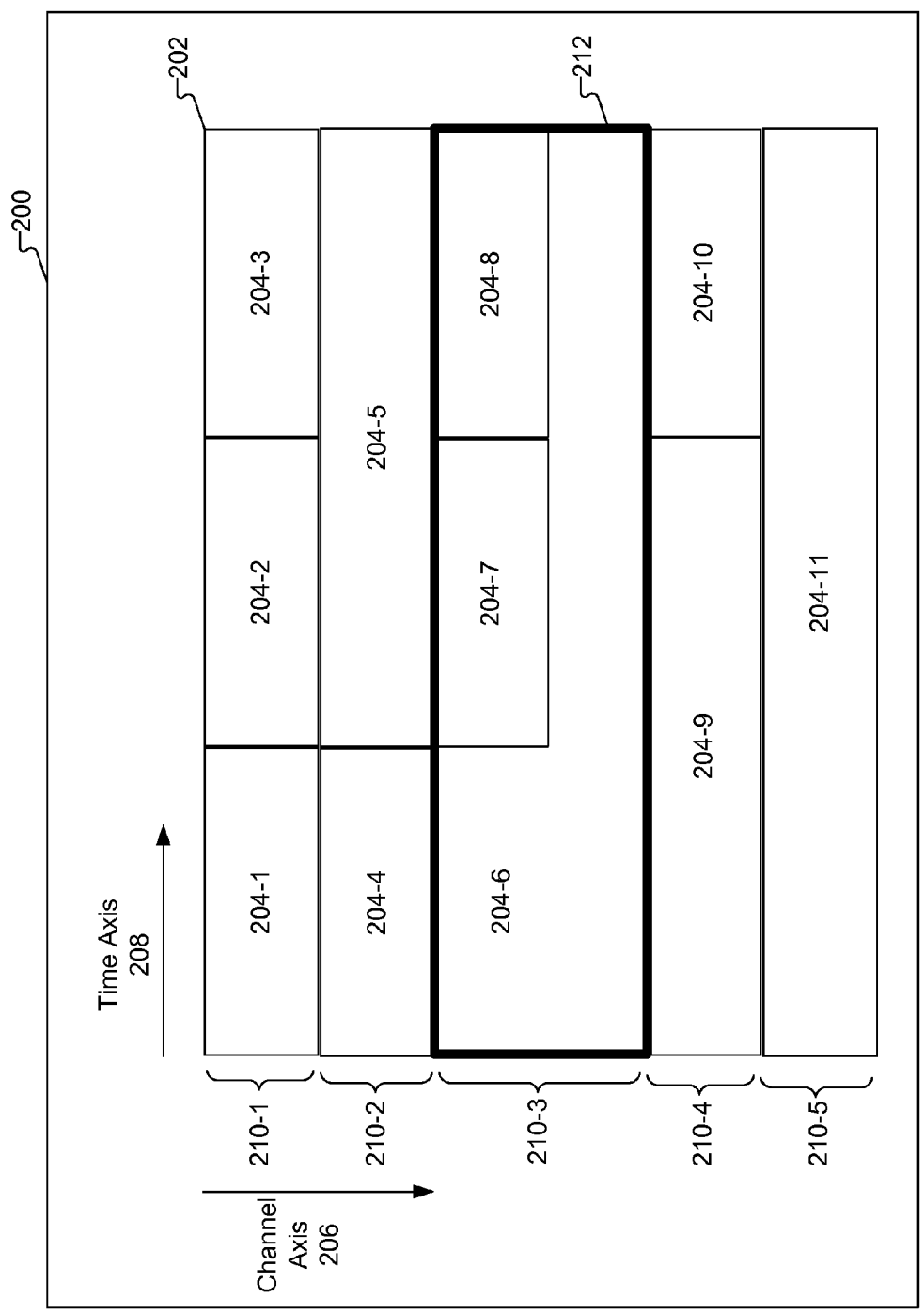
FIG. 2 illustrates an exemplary unified media program guide user interface according to principles described herein.

To illustrate, FIG. 2 shows an exemplary media program guide user interface 200 ("user interface 200") that includes user interface content representing a unified media program guide. As shown, user interface 200 may include a grid 202 of cells 204 (e.g., cells 204-1 through 204-11) representing media content of different types. In the illustrated example, the grid 202 of cells 204 includes a two-dimensional matrix grid in which the cells 204 are positioned relative to a programming channel axis 206 and a time axis 208 to represent a transmission schedule for scheduled-type media content. The channel axis 206 may be oriented in a vertical direction as shown, with rows 210 (e.g., rows 210-1 through 210-5) representing different programming channels arranged along the channel axis 206. Cells 204 may be positioned within rows 210 to visually indicate associations between programming channels and media content represented by the cells 204.

As used herein, a "programming channel" may refer to any physical or virtual entity capable of being selected by a user to access media content associated with the programming channel. For example, a programming channel may include a television programming channel that may be selected by a user to access live television programming content associated with (e.g., distributed by way of) the television programming channel. As another example, a programming channel may be a virtual on-demand-type media content programming channel that may be selected by a user to access on-demand-type media content and/or information about on-demand-type media content associated with the channel. Thus, a programming channel may be associated with a particular type of media content, such as scheduled-type media content or on-demand-type media content.

The time axis 208 may be oriented in a horizontal direction as shown, and cells 204 may be arranged along the time access 208 to visually indicate associations between times along the time access 208 and timeslots of scheduled transmission times of scheduled-type media content represented by one or more of the cells 204.

As mentioned, the media program guide represented in user interface 200 may be unified in that different types of media content may be represented in the media program guide. For example, one or more cells 204 may represent scheduled-type media content, and one or more other cells 204 may represent on-demand-type media content. To illustrate, in one example, cell 204-11 may represent and/or otherwise be associated with on-demand-type media content (e.g., one or more on-demand-type media programs such as a single on-demand-type media program or a collection of on-demand-type media programs), and the other cells 204-1 through 204-10 may represent and/or otherwise be associated with scheduled-type media content (e.g., scheduled-type media programs).

User interface 200 may include a cell selector window 212 ("selector window 212") positioned relative to the grid 202 of cells 204 to select a particular cell included in the grid 202 cells 204. In FIG. 2, the selector window 212 is positioned relative to the grid 202 of cells 204 such that cell 204-6 is selected by the selector window 212. Program guide facility 102 may detect which of the cells 204 is currently selected by the selector window 212 in any suitable way, such as based on the position of the selector window 212 relative to the grid 202 of cells 204.

Program guide facility 102 may be configured to change the position of the selector window 212 relative to the grid 202 of cells 204 in response to user input, such as user input provided by a user to navigate within a media program guide. Program guide facility 102 may change the position of the selector window 212 relative to the grid 202 of cells 204 in any suitable manner, such as by moving a position of the selector window 212 and/or a position of the grid 202 of cells 204 within the user interface 200. In certain examples, the position of the selector window 212 may be fixed within user interface 200 (e.g., at a substantially central position within user interface 200), and the grid 202 of cells 204 may be scrolled vertically and/or horizontally within user interface 202 to move different cells 204 into and/or out of the selector window 212.

Program guide facility 102 may selectively configure one or more features of the media program guide presented in user interface 200 based on which type of media content is represented by a cell of the media program guide that is currently selected in user interface 200. To this end, program guide facility 102 may detect which type of media content is represented by the selected cell, and configure one or more features of the media program guide based on the determination.

In some examples, program guide facility 102 may determine that the currently selected cell represents scheduled-type media content and, in response, configure one or more features of the media program guide such that the media program guide is well-suited for representing scheduled-type media content. The media program guide configured in this manner may be a scheduled-type-media-content version of the media program guide.

In other examples, program guide facility 102 may determine that the currently selected cell represents on-demand-type media content and, in response, configure one or more features of the media program guide such that the media program guide is well-suited for representing on-demand-type media content. The media program guide configured in this manner may be an on-demand-type-media-content version of the media program guide.

One or more features of the media program guide may be different across the media-content-type-specific versions of the media program guide. Such differences in features may produce versions of the media program guide that are suited for particular types of media content. One or more other features (e.g., visual layouts, navigation tools, navigation flows, navigation inputs, organization of information, and/or theories of operation) of the media program guide may remain consistent across the media-content-type-specific versions of the media program guide. Such consistencies in features may produce uniformity between the versions of the media program guide, which may help facilitate a uniform user experience with a unified media program guide presented within the user interface 200.

In certain examples, program guide facility 102 may selectively configure one or more features of the selector window 212 based on which type of media content is represented by the cell selected by the selector window 212. Program guide facility 102 may configure one or more features of the selector window 212 in a manner that tailors the selector window 212 to represent a specific type of media content. Accordingly, the selector window 212 may be a multi-function selector window capable of adapting to selectively represent different types of media content based on which type of media content is represented by a cell currently selected by the selector window 212.

Examples of program guide facility 102 selectively configuring one or more features of a selector window of a media program guide based on selected types of media content will now be described in reference to exemplary views of a media program guide that may be displayed on a display screen as shown in FIGS. 3-12.

Figure 3:
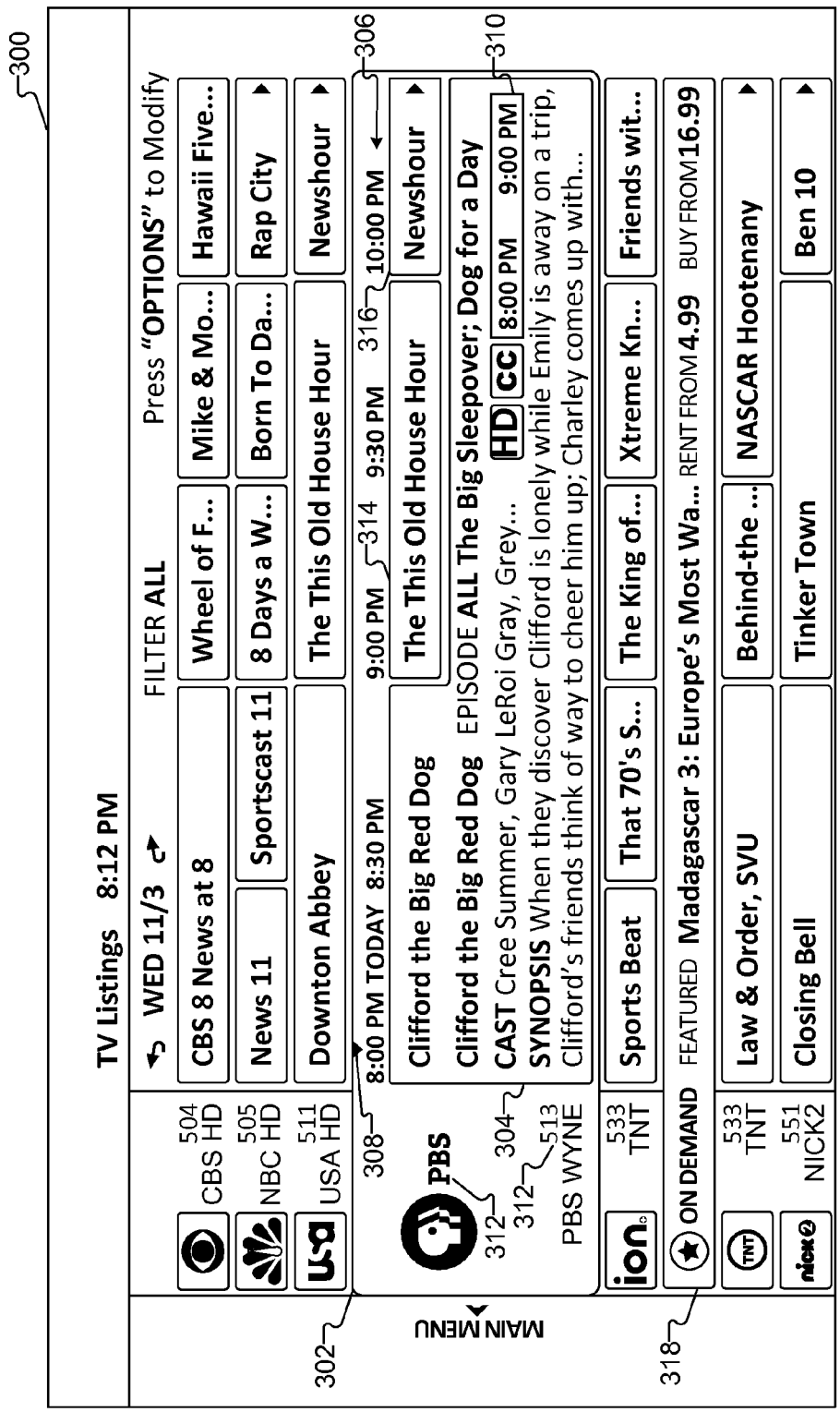
FIGS. 3-12 illustrate exemplary views of a unified media program guide user interface that may be displayed on a display screen according to principles described herein.

FIG. 3 illustrates a view 300 of a media program guide user interface in which a selector window 302 is positioned to select a particular cell 304 within a grid of cells representing media content of different types in a media program guide. Program guide facility 102 may detect that cell 304 is selected and that cell 304 represents scheduled-type media content, which in this example is an episode of a television program titled "Clifford the Big Red Dog" that is scheduled to be transmitted by way of a specific programming channel (e.g., a programming channel labeled "PBS" and having programming channel number "513") during a specific timeslot (e.g., 8:00 PM-9:00 PM) on a specific date (e.g., November $3^{rd}$), as visually indicated in view 300.

In response to the detection that the selected cell 304 represents scheduled-type media content, program guide facility 102 may configure selector window 302 to be a scheduled-type-media-content version of the selector window 302. This may include program guide facility 102 configuring one or more features of the selector window 302 such that the selector window 302 is well-suited to represent scheduled-type media content.

As an example, program guide facility 102 may configure a feature of the selector window 302 by including, within the selector window 302, selector window content representing a time axis 306 associated with a transmission schedule for the scheduled-type media content. In the illustrated example, the time axis 306 is displayed horizontally across a top area of the selector window 302 and represents a timeline that spans a period of time (e.g., a two and a half hour period of time) currently represented in view 300. The programming timeslot for the media program represented by cell 304 is included within the time period spanned by the timeline. By selectively including the time axis 306 within selector window 302 instead of persistently and/or elsewhere in the media program guide, program guide facility 102 may facilitate intuitive representation of different types of media content within selector window 302 and the media program guide.

As another example, program guide facility 102 may configure a feature of the selector window 302 by including, within the selector window 302, selector window content indicating a present time. For example, a present time indicator 308 may be displayed at a position along time axis 306 to indicate a present time.

As another example, program guide facility 102 may configure a feature of the selector window 302 by including, within the selector window 302, selector window content representing a timeslot associated with a transmission schedule for the scheduled-type media content. For example, a timeslot indicator 310 indicating the timeslot during which the media program represented by cell 304 is scheduled for transmission may be displayed within the selector window 302.

As another example, program guide facility 102 may configure a feature of the selector window 302 by including, within the selector window 302, selector window content representing a spatially expanded version of cell 304. That is, cell 304 may be expanded to occupy more screen space than cell 304 occupied before its selection to allow for selector window content representing information about the media program represented by cell 304 to be displayed within cell 304. As shown in view 300, the size of cell 304 has been expanded to be larger than other cells of the media program guide. When expanded, cell 304 may include selector window content representing various details about the media program represented by cell 304. In view 300, for example, cell 304 includes content representing a title, episode information, cast information, a synopsis, media format information (e.g., high-definition or "HD" indicator), and closed-captioning information for the media program represented by cell 304.

As another example, program guide facility 102 may configure a feature of the selector window 302 by including, within the selector window 302, selector window content representing a programming channel associated with a transmission schedule for the scheduled-type media content. For example, the selector window 302 may include channel indicators 312 indicating information (e.g., a logo, call letters, channel number, etc.) about the programming channel by way of which the media program represented by cell 304 is accessible.

As another example, program guide facility 102 may configure a feature of the selector window 302 by including, within the selector window 302, selector window content representing one or more other cells of the media program guide that are included in the same row as the selected cell 304. For example, the selector window 302 may include cell 314 and cell 316 representing other media programs that are in the same row as cell 304.

With one or more of the features of selector window 302 described above included in selector window 302, selector window 302 may be referred to as a scheduled-type-media-content version of the selector window 302 that is configured to represent scheduled-type media content. Accordingly, the media program guide illustrated in view 300 may be referred to as a scheduled-type-media-content version of the media program guide.

The media program guide illustrated in view 300 is a unified media program guide at least because the media program guide includes cells representing both scheduled-type media content and on-demand-type media content. For example, in addition to cells representing scheduled-type media content (e.g., selected cell 304 as described above), the media program guide includes a cell 318 representing on-demand-type media content. As shown, cell 318 occupies a particular row within the grid of cells of the media programming guide. The row occupied by cell 318 may be associated with a virtual on-demand media programming channel by way of which on-demand media content and/or information about the on-demand media content may be accessed.

Any on-demand media content may be associated with cell 318, including any of the types of on-demand media content described herein or other types of on-demand media content. In the illustrated example, a single on-demand media program in the form of a movie titled "Madagascar 3: Europe's Most Wanted" is represented by cell 318, as is indicated by information presented within cell 318. As shown, information in cell 318 may indicate the title of the movie, that the movie is accessible on-demand, and a cost to rent or purchase access to the on-demand movie.

With view 300 displayed, a user may provide input to select cell 318. For example, the user may provide input to change a position of selector window 302 relative to the grid of cells of the media program guide such that cell 318 is selected by the selector window 302 (e.g., by scrolling the grid of cells upward to bring cell 318 into the selector window 302).

Figure 4:
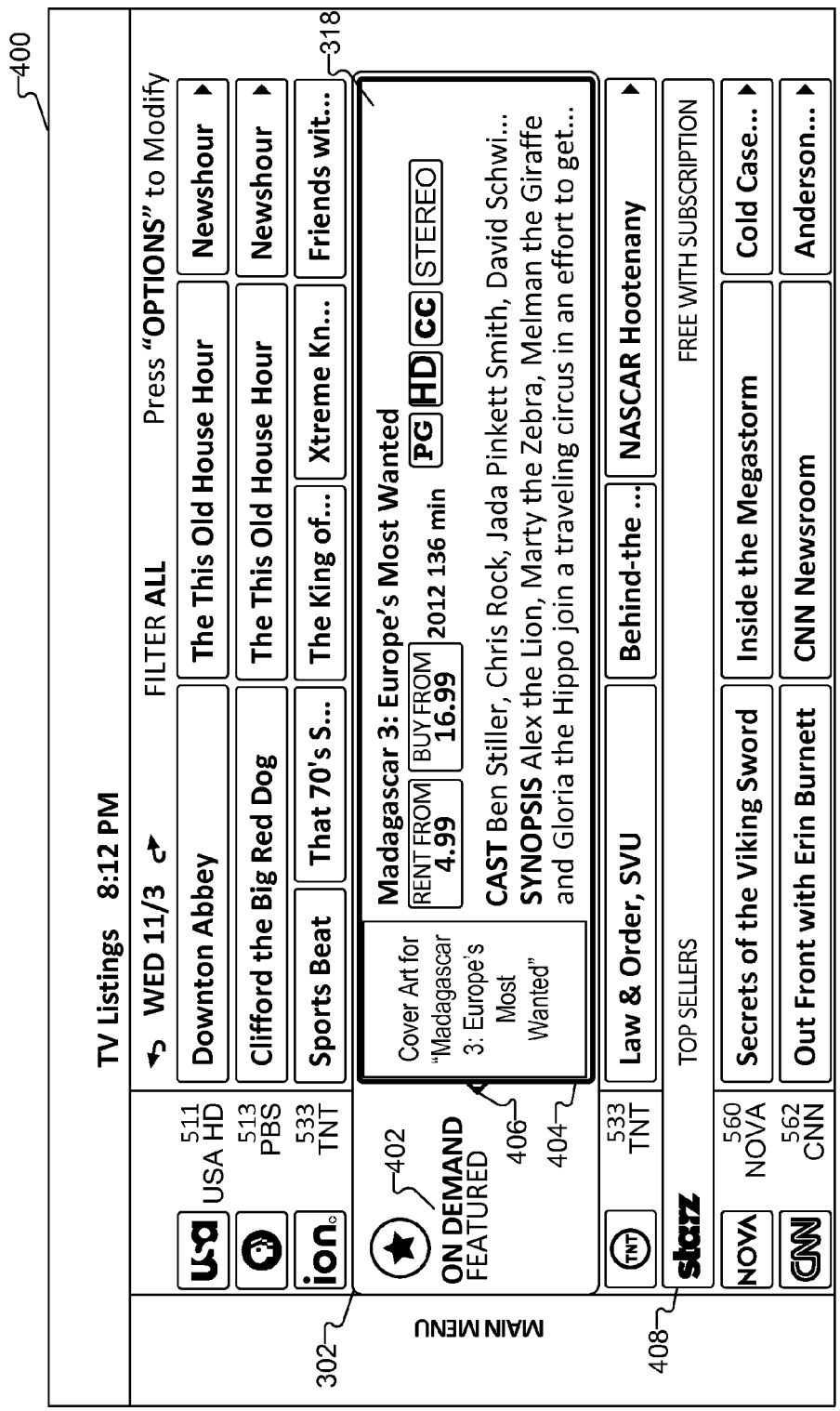

FIG. 4 illustrates a view 400 of the media program guide user interface in which selector window 302 is positioned to select cell 318 within the grid of cells of the media program guide. Program guide facility 102 may detect that cell 318 is selected and that cell 318 represents on-demand-type media content, which in this example is the movie titled "Madagascar 3: Europe's Most Wanted" that is available for on-demand access.

In response to the detection that the selected cell 318 represents on-demand-type media content, program guide facility 102 may configure selector window 302 to be an on-demand-type-media-content version of the selector window 302. This may include program guide facility 102 configuring one or more features of the selector window 302 such that the selector window 302 is well-suited to represent on-demand-type media content.

As an example, program guide facility 102 may configure a feature of the selector window 302 by omitting, from the selector window 302, selector window content representing the time axis 306 associated with a transmission schedule for the scheduled-type media content. As another example, program guide facility 102 may configure a feature of the selector window 302 by omitting, from the selector window 302, selector window content indicating a present time, such as by omitting present time indicator 308 from the selector window 302. As another example, program guide facility 102 may configure a feature of the selector window 302 by omitting, from the selector window 302, selector window content representing a timeslot associated with a transmission schedule for the scheduled-type media content, such as by omitting timeslot indicator 310 from the selector window 302. Because the media content represented by cell 318 is accessible on-demand, the time axis 306, present time indicator 308, timeslot indicator 310, and/or other transmission schedule information for the scheduled-type media content represented in the media program guide may not be relevant or helpful to the user. Accordingly, the time axis 306, present time indicator 308, timeslot indicator 310, and/or other selector window content representative of transmission schedule information for scheduled-type media content may be omitted from the selector window 302 when the selector window 302 selects a cell that represents on-demand-type media content. The omission of such selector window content from selector window 302 may free up screen space within the selector window 302 for other information related to the on-demand-type media content represented by the cell 318.

As another example, program guide facility 102 may configure a feature of the selector window 302 by including, within the selector window 302, selector window content representing a spatially expanded version of cell 318. That is, cell 318 may be expanded to occupy more screen space than cell 318 occupied before its selection to allow for selector window content representing information about the on-demand-type media content represented by cell 318 to be displayed within cell 318. As shown in view 300, the size of cell 318 has been expanded to be larger than other cells of the media program guide. When expanded, cell 318 may include selector window content representing various details about the on-demand-type media content represented by cell 318. In view 300, for example, cell 318 includes content representing a cover art image, a title, cast information, a synopsis, media format information (e.g., "HD" indicator), closed-captioning information, audio output information (e.g., "STEREO" indicator), rating information (e.g., "PG" indicator), release date information (e.g., year of release), duration information, and rental and purchase cost information for the media program represented by cell 318.

As another example, program guide facility 102 may configure a feature of the selector window 302 by including, within the selector window 302, selector window content representing a programming channel associated with on-demand-type media content. For example, the selector window 302 may include an indicator 402 indicating that the on-demand-type media content represented by cell 318 is accessible by way of a virtual on-demand programming channel. In certain examples, indicator 402 may be configured to function as a user-selectable link to an on-demand user interface through which a user may discover and access additional on-demand-type media content options. The on-demand user interface may be separate from the media program guide user interface.

An another example, program guide facility 102 may configure a feature of the selector window 302 by including, within the selector window 302, selector window content representing a selector object 404 to indicate a selection of an option within selector window 302. For example, selector window 302 may include multiple menu options each selectable by a user. In view 400, cell 318 may be a menu option selectable by the user to access the on-demand-type media program represented by cell 318, and indicator 402 may indicate another menu option selectable by the user to access an on-demand user interface through which a user may discover and access additional on-demand-type media content options. The user may provide input to toggle selector object 404 between cell 318 and indicator 402. In the illustrated example, selector object 404 is positioned to select cell 318, and a toggle indicator 406 indicates that toggle input (e.g., a left directional input) may be provided by the user to move selector object 404 from cell 318 to indicator 402.

With one or more of the features of selector window 302 described above implemented in selector window 302, selector window 302 may be referred to as an on-demand-type-media-content version of the selector window 302. Accordingly, the media program guide illustrated in view 400 may be referred to as an on-demand-type-media-content version of the media program guide.

The specific on-demand-type media content represented by cell 318 in FIG. 4 is illustrative only. A cell of the media program guide may represent other on-demand-type media content in other examples. For example, a cell of the media program guide may represent a collection of on-demand-type media programs. The collection may be any grouping of media programs, such as a grouping defined by a media service provider to promote certain media content on a promotional on-demand programming channel, a grouping of episodes of a television show (e.g., into a season of episodes) on a television-show-specific on-demand programming channel, a grouping of DVR recorded media programs (e.g., episodes of a television show) on a virtual DVR programming channel, etc. FIG. 4 illustrates a cell 408 that represents a collection of "top seller" media programs provided by a particular media content provider known as "STARZZ."

Program guide facility 102 may configure one or more features of selector window 302 differently for different examples of on-demand-type media content. When cell 408 is selected, for example, program guide facility 102 may configure one or more features of selector window 302 based on the collection of on-demand-type media programs represented by cell 408.

Examples of program guide facility 102 configuring one or more features of selector window 302 based on a selection of a cell that represents a collection of media programs will now be described.

Figure 5:
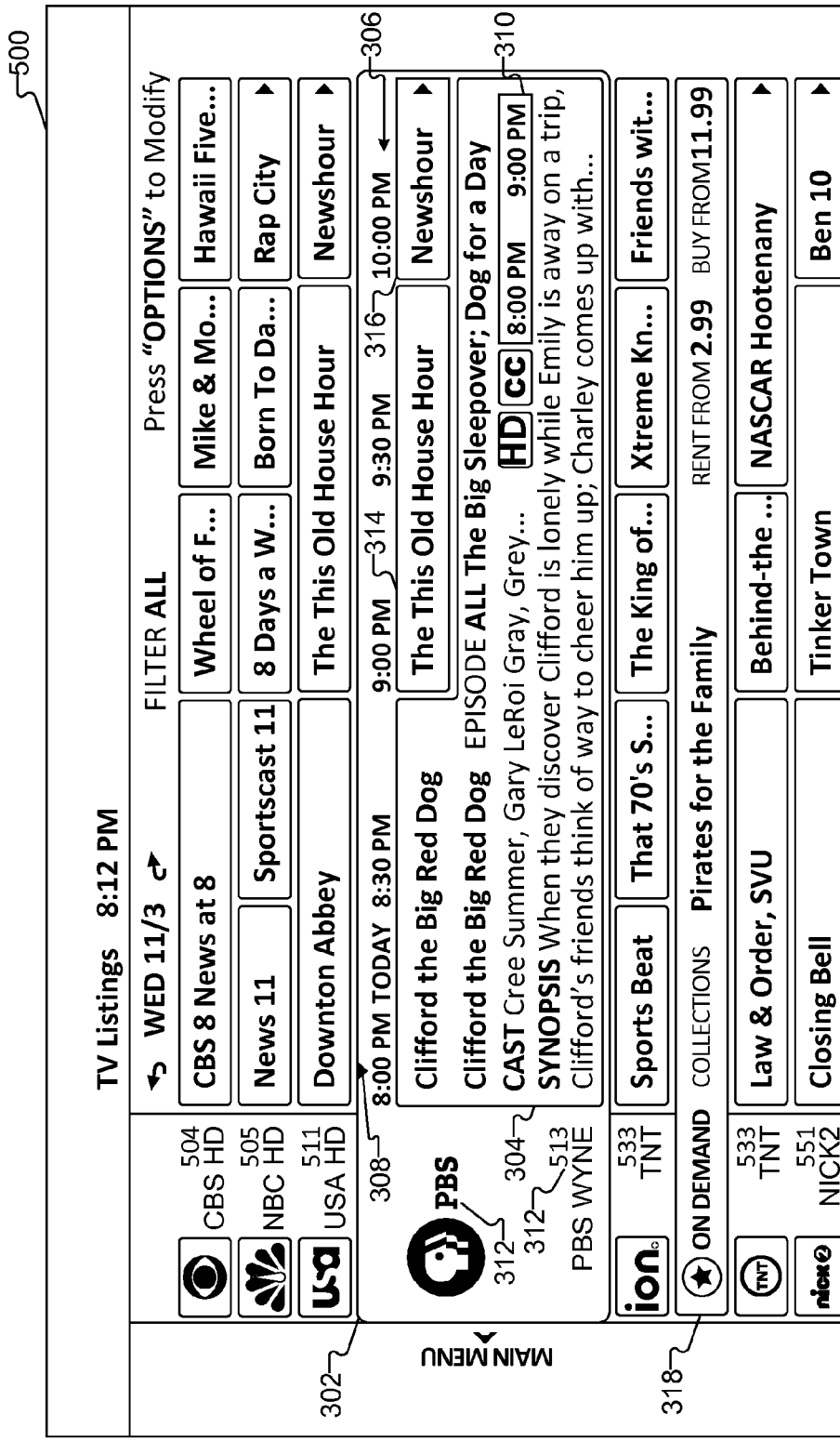

FIG. 5 illustrates a view 500 of the media program guide user interface in which selector window 302 is positioned to select cell 304 within the grid of cells of the media program guide. View 500 is similar to view 300, except that cell 318 represents a collection of on-demand-type media programs as shown in view 500 rather than a single on-demand-type media program as shown in view 300. In view 500, cell 318 represents a collection of on-demand-type media programs associated with pirates, such as family-appropriate movies about pirates (e.g., movies having titles that include the word "pirates" and have a rating appropriate for family viewing).

With view 500 displayed, a user may provide input to select cell 318. For example, the user may provide input to change a position of selector window 302 relative to the grid of cells such that cell 318 is selected by the selector window 302 (e.g., by scrolling the grid of cells upward to bring cell 318 into the selector window 302).

Figure 6:
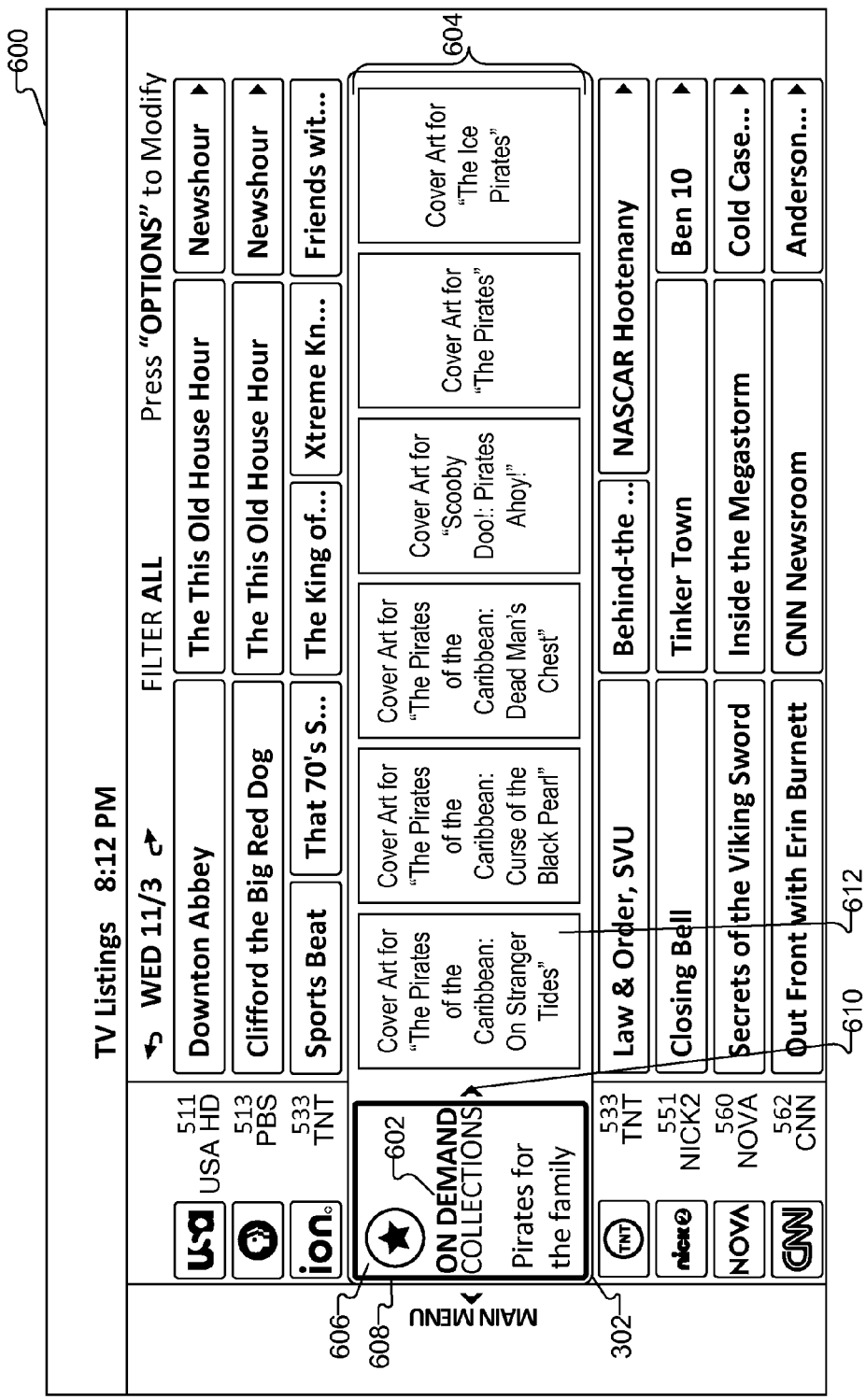

FIG. 6 illustrates a view 600 of the media program guide user interface in which selector window 302 is positioned to select cell 318 within the grid of cells of the media program guide. Program guide facility 102 may detect that cell 318 is selected and that cell 318 represents on-demand-type media content, which in this example is a collection of family-appropriate movies about pirates available for on-demand access.

In response to the detection that the selected cell 318 represents a collection of on-demand-type media programs, program guide facility 102 may configure selector window 302 to be an on-demand-type-media-content version of the selector window 302. This may include program guide facility 102 configuring one or more features of the selector window 302 such that the selector window 302 is well-suited to represent a collection of on-demand-type media programs.

As an example, program guide facility 102 may configure one or more features of the selector window 302 by omitting, from the selector window 302, selector window content representing the time axis 306, a present time (e.g., by omitting present time indicator 308), and/or a timeslot (e.g., by omitting timeslot indicator 310), such as described herein.

As another example, program guide facility 102 may configure a feature of the selector window 302 by including, within the selector window 302, selector window content representing a spatially expanded version of cell 318. That is, cell 318 may be expanded to occupy more screen space than cell 318 occupied before its selection to allow for selector window content representing information about the on-demand-type media content represented by cell 318 to be displayed within cell 318. As shown in view 600, the size of cell 318 has been expanded to be larger than other cells of the media program guide. When expanded, cell 318 may include selector window content representing various details about the collection of on-demand-type media programs represented by cell 318. In view 600, for example, cell 318 includes content representing cover art images for the on-demand-type media programs included in the collection.

As another example, program guide facility 102 may configure a feature of the selector window 302 by including, within the selector window 302, selector window content representing a programming channel associated with on-demand-type media content. For example, the selector window 302 may include an indicator 602 indicating that the collection of on-demand-type media programs represented by cell 318 is accessible by way of a virtual on-demand programming channel.

As another example, program guide facility 102 may configure a feature of the selector window 302 by including, within the selector window 302, selector window content representing a media program browse carousel 604 in which the on-demand-type media programs in the collection are represented by cover art images arranged as a menu of cover art images, such as is shown in view 600. The menu of cover art images may be horizontally scrollable within selector window 302 in a carousel-type manner such that cover art images may be moved in and out of the selector window 302 in response to user input.

In certain examples, the carousel 604 may further include a bookend menu option at either or both ends of the menu of cover art images. In view 600, for example, selector window 302 includes a bookend menu option 606 positioned at a left end of the menu of cover art images representing the on-demand-type media programs in the collection. Bookend menu option 606 may be selectable by a user to access an on-demand user interface (e.g., a user interface view dedicated to the collection of on-demand-type media programs represented by cell 318) through which a user may discover and access additional on-demand-type media content options.

As another example, program guide facility 102 may configure a feature of the selector window 302 by including, within the selector window 302 and/or within the media program browse carousel 604, selector window content representing a selector object 608 to indicate a selection of a menu option within selector window 302. A user may provide input to cause selector object 608 to move side-to-side and from menu option to menu option within selector window 302. In view 600, selector object 608 is positioned to select bookend menu option 606, and a toggle indicator 610 indicates that toggle input (e.g., a right directional input) may be provided by the user to move selector object 608 from bookend menu option 606 to a first cover art image 612 included in the menu of cover art images in the media program browse carousel 604.

Figure 7:
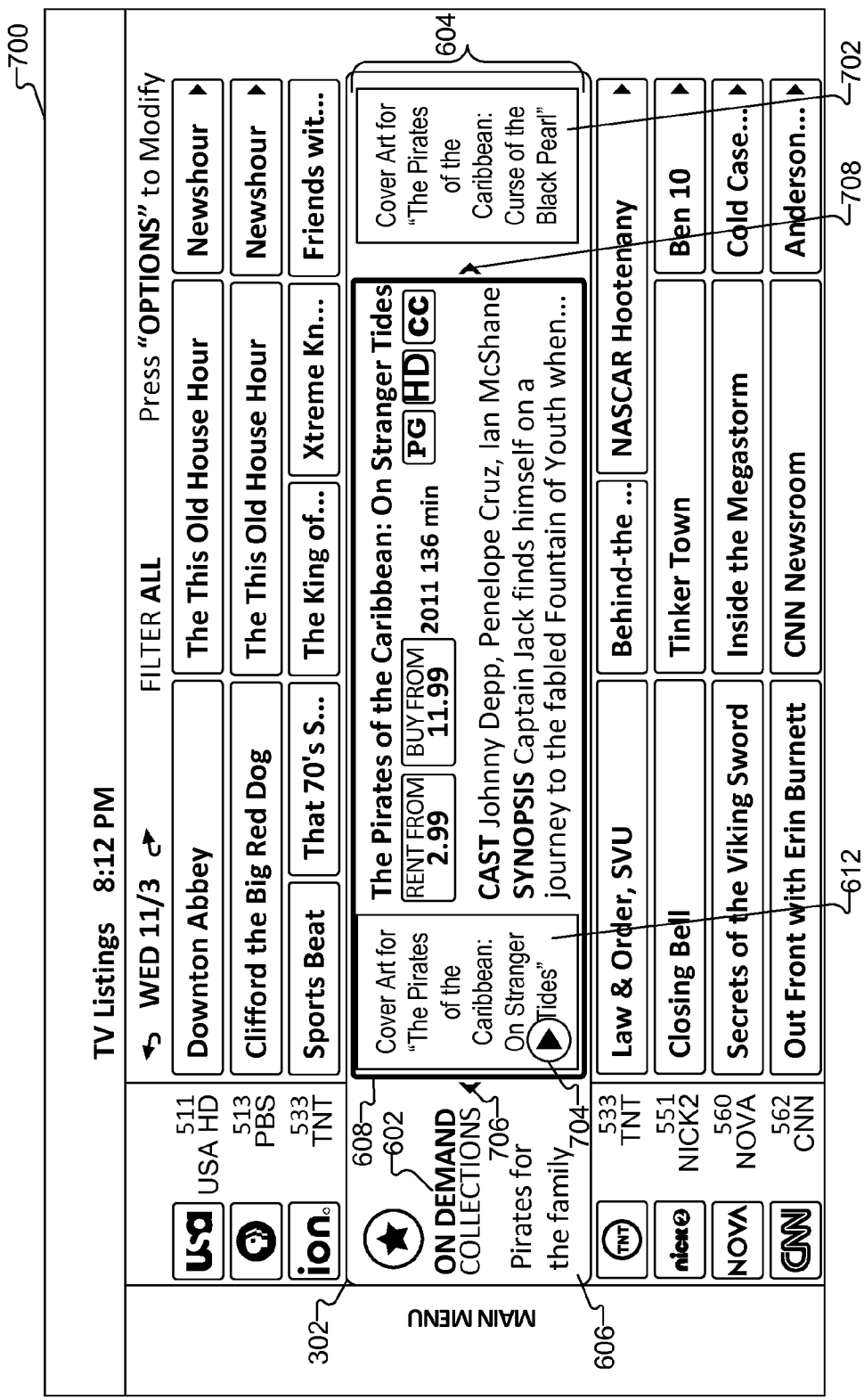

In response to selector object 608 moving from bookend menu option 606 to the first cover art image 612, program guide facility 102 may configure the selector window content in selector window 302 such as by updating the selector window content to represent a selection of the first cover art image 612. FIG. 7 illustrates a view 700 of the media program guide user interface in which selector object 608 is positioned to select the first cover art image 612 within the media program browse carousel 604.

When selector object 608 is positioned to select a cover art image included in the menu of cover art images in the carousel 604, program guide facility 102 may configure selector window content to represent the media program represented by the cover art image. As an example, program guide facility 102 may configure a feature of the selector window 302 by expanding the size of the selector object 608 and populating the expanded selector object 608 with selector window content representing the media program. In view 700, for example, expanded selector object 608 includes selector window content representing a cover art image, a title, cast information, a synopsis, media format information (e.g., "HD" indicator), closed-captioning information, rating information (e.g., "PG" indicator), release date information (e.g., year of release), duration information, and rental and purchase cost information for the media program represented by the selected cover art image 612.

As another example, program guide facility 102 may configure a feature of the selector window 302 by moving one or more menu options into or out of selector window 302 based on a movement of selector object 608 within selector window 302. For example, in response to selector object 608 moving from bookend menu option 606 to cover art image 612, program guide facility 102 may move one or more other cover art images out of selector window 302 to make room for an expansion of selector object 608. In view 700, the first cover art image 612 selected by selector object 608 is centered within selector window 302 with immediately adjacent menu options displayed and either side of the selector object 608. For instance, bookend menu option 606 is displayed to the left of selector object 608, and a second cover art image 702 is displayed to the right of selector object 608.

With the cover art image 612 selected by selector object 608 as shown in FIG. 7, a user may provide input to access additional information about the media program represented by the cover art image 612 and/or to access and launch a playback of the media program represented by the cover art image 612. If the user does not have permission to access to the media program, playback of other media content related to the media program (e.g., a trailer for the media program) may instead be played back. In view 700, a playback indicator 704 is displayed within selector object 608 to visually indicate that a playback of the media program or other related media content may be launched directly from view 700.

With view 700 displayed as shown in FIG. 7, the user may provide input to toggle selector object 608 from the first cover art image 612 to either of the adjacent menu options (e.g., bookend menu option 606 or the second cover art image 702). Selector window 302 may include a toggle indicator 706 indicating that toggle input (e.g., a left directional input) may be provided by the user to move selector object 608 from the first cover art image 612 to the bookend menu option 606, and a toggle indicator 708 indicating that toggle input (e.g., a right directional input) may be provided by the user to move selector object 608 from the first cover art image 612 to the second cover art image 702.

Figure 8:
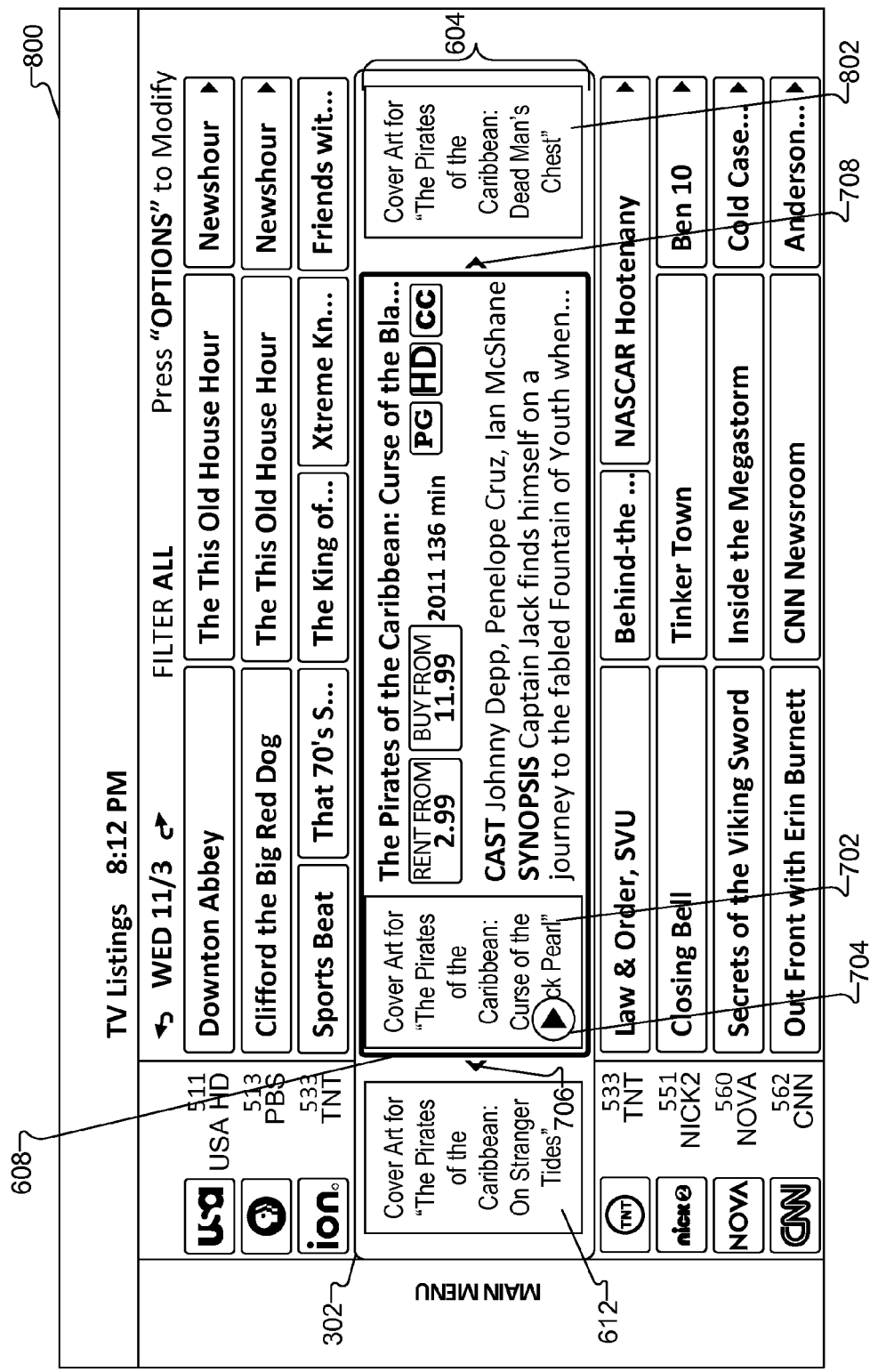

In response to selector object 608 moving from the first cover art image 612 to the second cover art image 702 (e.g., by scrolling the carousel 604 to move the second cover art image 702 into selector object 608), program guide facility 102 may configure the selector window content in selector window 302 such as by updating the selector window content to represent a selection of the second cover art image 702. FIG. 8 illustrates a view 800 of the media program guide user interface in which selector object 608 is positioned to select the second cover art image 702. In response to a selection of the second cover art image 702, program guide facility 102 may configure selector window 302 to represent the selection of the second cover art image 702.

As an example, program guide facility 102 may configure a feature of the selector window 302 by populating the expanded selector object 608 with selector window content representing the media program. In view 800, for example, expanded selector object 608 includes selector window content representing the cover art image 702, a title, cast information, a synopsis, media format information (e.g., "HD" indicator), closed-captioning information, rating information (e.g., "PG" indicator), release date information (e.g., year of release), duration information, and rental and purchase cost information for the media program represented by the selected cover art image 702.

As another example, program guide facility 102 may configure a feature of the selector window 302 by moving one or more menu options into or out of selector window 302 based on a movement of selector object 608 within selector window 302. For example, in response to selector object 608 moving from the first cover art image 612 to the second cover art image 702, program guide facility 102 may move bookend menu option 606 out of selector window 302 and a third cover art image 802 into selector window 302. In view 800, the second cover art image 702 selected by selector object 608 is centered within selector window 302 with immediately adjacent menu options displayed on either side of the selector object 608. For instance, the first cover art image 612 is displayed to the left of selector object 608, and the third cover art image 802 is displayed to the right of selector object 608 in carousel 604.

Figure 9:
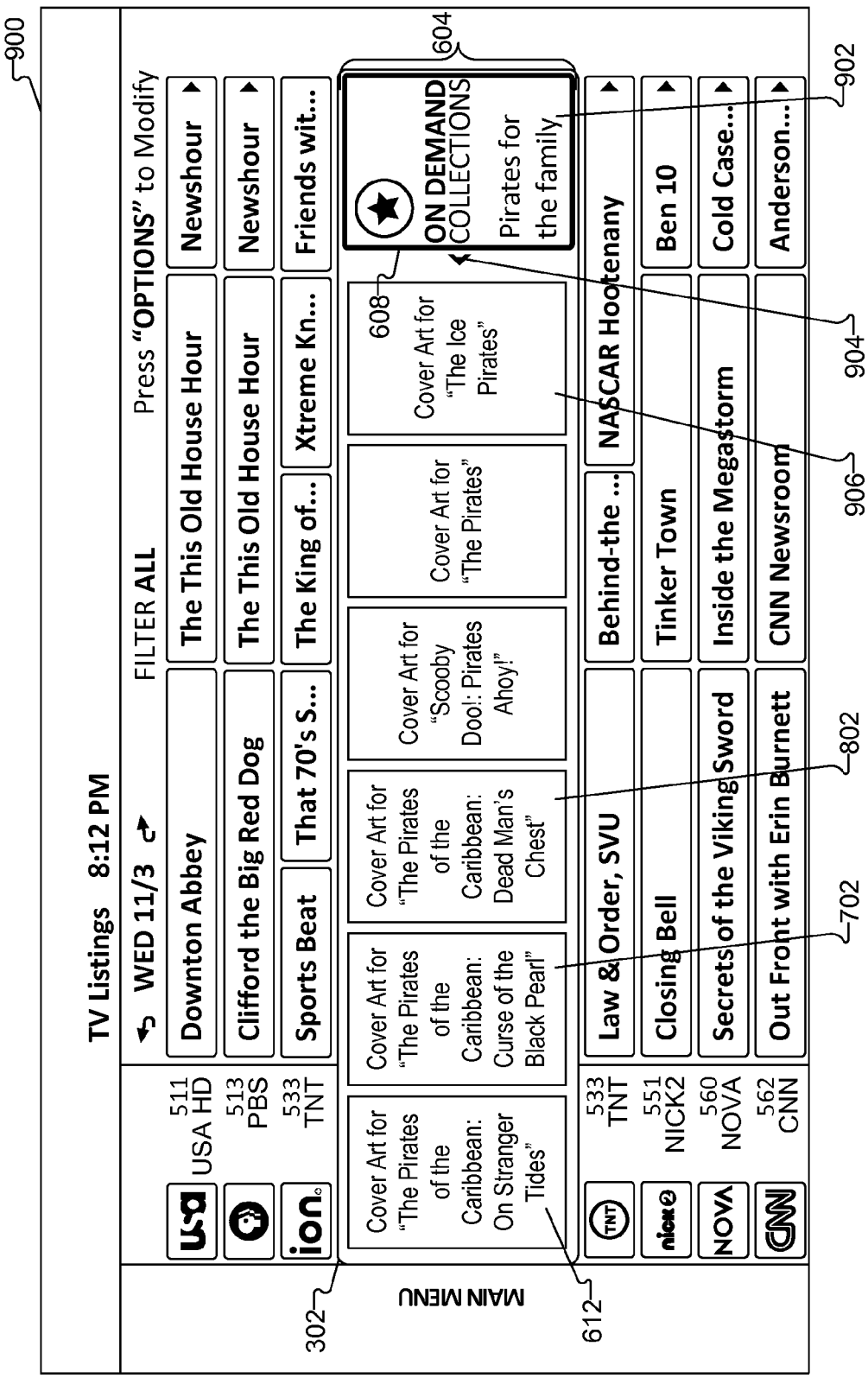

The user may provide input to continue to move selector object 608 to the right along the menu of options in carousel 604 until the selector object 608 reaches a right-most option in the carousel 604. FIG. 9 illustrates a view 900 of the media program guide user interface in which selector object 608 is positioned to select a right bookend menu option 902 in the carousel 604. The right bookend menu option 902 may be selectable by a user to access an on-demand user interface (e.g., a user interface view dedicated to the collection of on-demand-type media programs represented by cell 318) through which a user may discover and access additional on-demand-type media content options.

In view 900, selector object 608 is positioned to select bookend menu option 902, and a toggle indicator 904 indicates that toggle input (e.g., a left directional input) may be provided by the user to move selector object 608 from bookend menu option 902 to a cover art image 906 adjacent to the bookend menu option 902.

Figure 10:
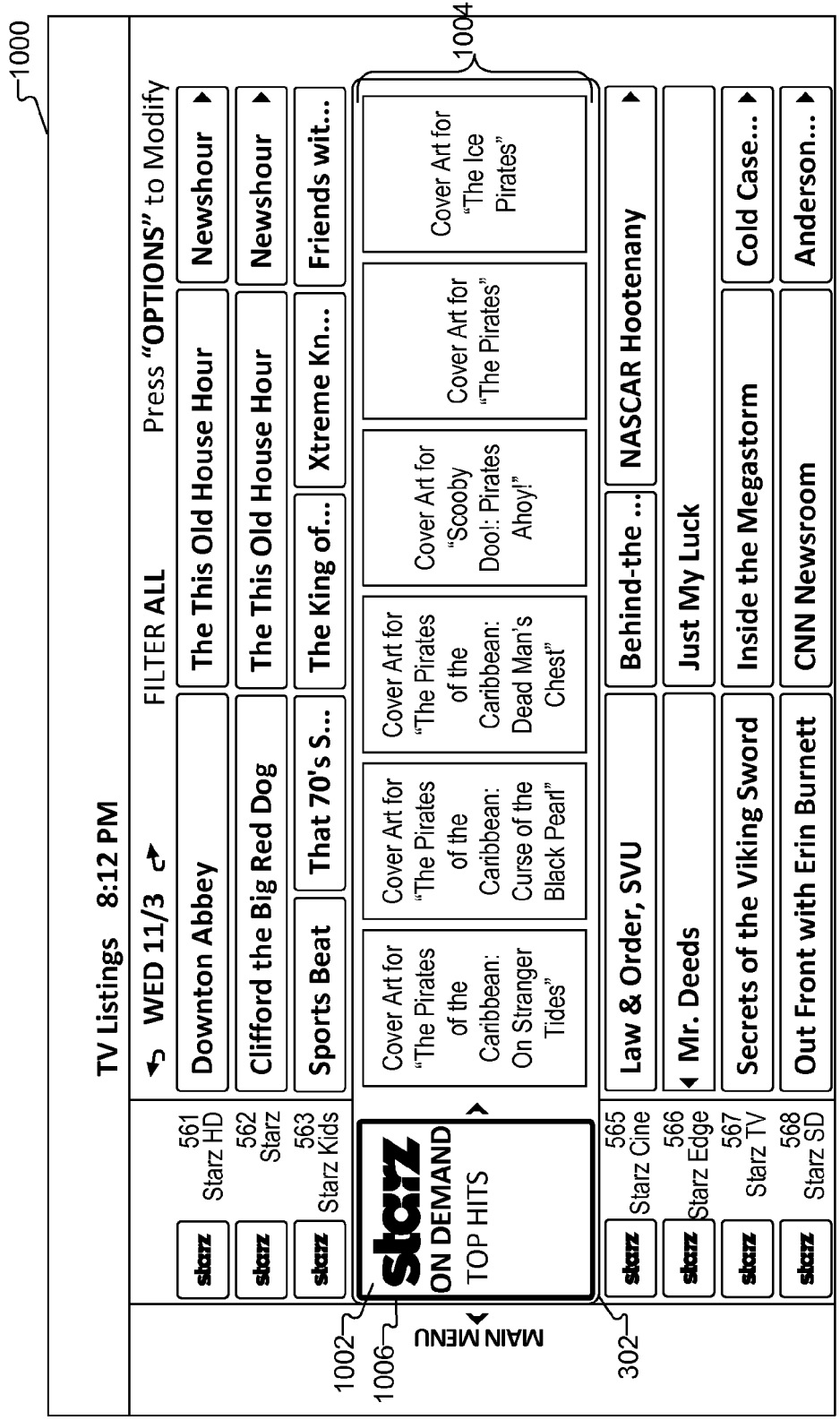
Figure 11:
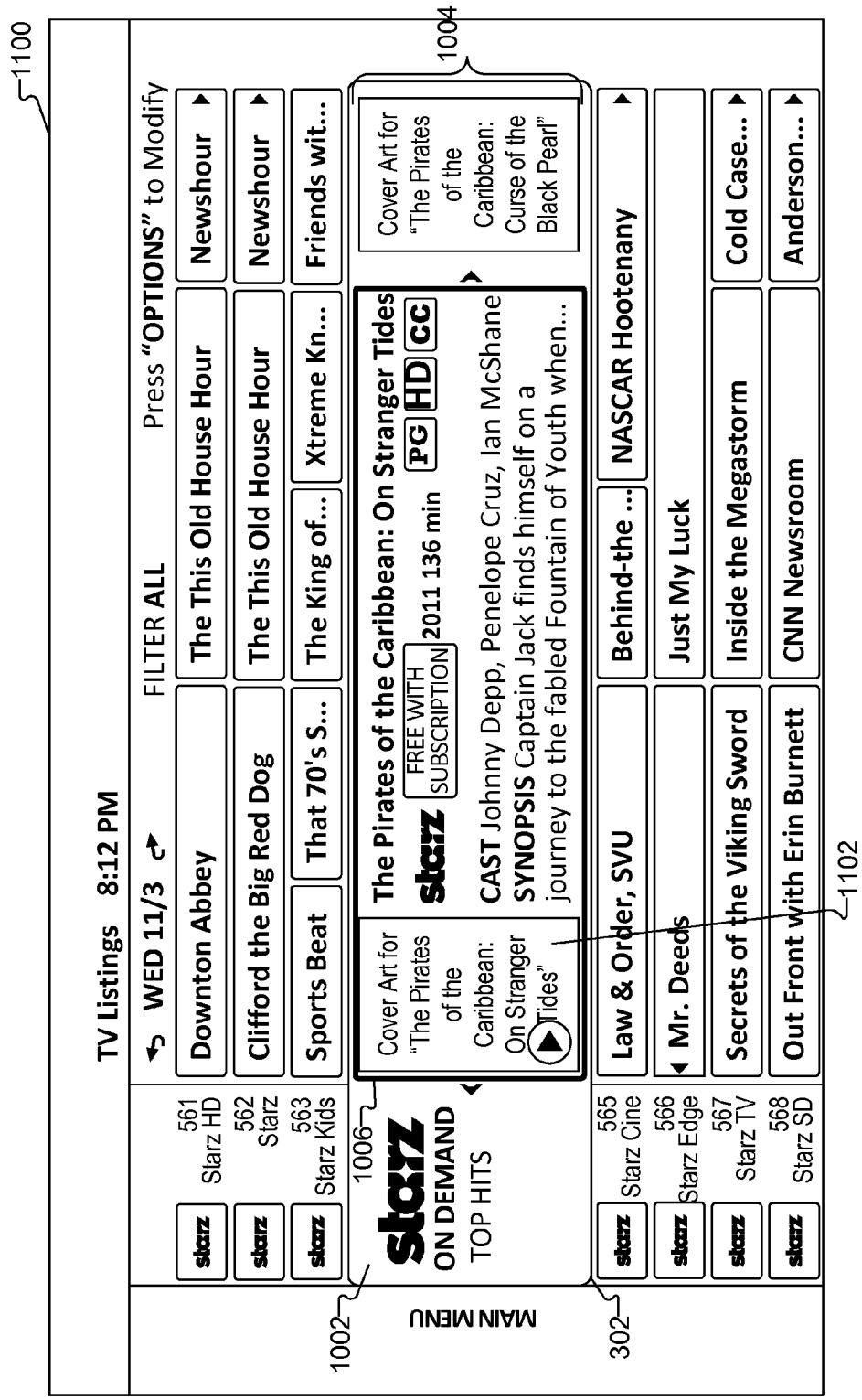
Figure 12:
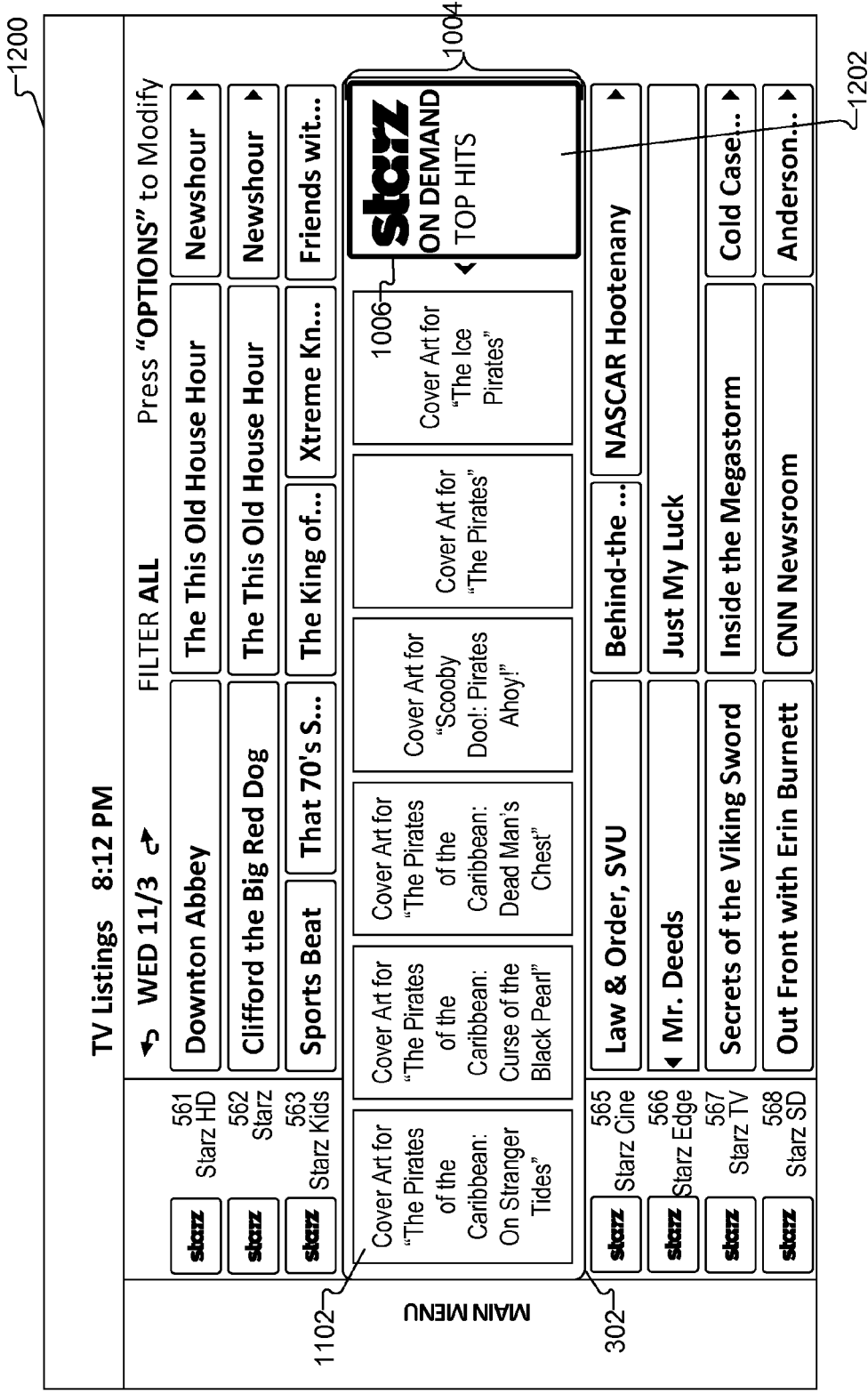

In certain examples, a collection of on-demand-type media programs may be associated with (e.g., provided by) a specific media content provider (e.g., STARZZ, HBO, etc.). In such examples, program guide facility 102 may configure a media program guide in any of the ways described herein when a cell in the media program guide is selected and represents a media-content-provider-specific collection of on-demand-type media programs. FIGS. 10-12 illustrates views in which selector window 302 is positioned to select a cell representing a media-content-provider-specific collection of on-demand-type media programs and in which one or more features of selector window 302 are configured based on the media-content-provider-specific collection of on-demand-type media programs represented by the cell. FIG. 10 illustrates a view 1000 in which a first bookend menu option 1002 within a media program browse carousel 1004 is selected by a selector object 1006 within selector window 302. FIG. 11 illustrates a view 1100 in which a cover art image menu option 1102 within the media program browse carousel 1004 is selected by the selector object 1006 within selector window 302. FIG. 12 illustrates a view 1200 in which a second bookend menu option 1202 within the media program browse carousel 1004 is selected by the selector object 1006 within selector window 302.

As shown in FIGS. 10-12, the cell that represents the media-content-provider-specific collection of on-demand-type media programs may be associated with a virtual on-demand programming channel row displayed within a channel-lineup of programming channels associated with scheduled-type media content provided by the same media content provider. Accordingly, a user may have convenient access, within a media program guide user interface view, to information about both scheduled-type media content and on-demand-type media content provided by a specific media content provider.

With one or more of the features of selector window 302 configured as described above when selector window 302 is positioned to select a cell representative of on-demand-type media content, selector window 302 may be referred to as an on-demand-type-media-content version of the selector window 302. Accordingly, the media program guide represented in the media program user interface in which an on-demand-type-media-content version of the selector window 302 is presented may be referred to as an on-demand-type-media-content version of the media program guide.

While certain examples of media programs guides are used to illustrate principles described herein, the exemplary media program guides are illustrative only. Principles described herein may apply to other suitable media program guides as may suit a particular implementation. For example, information representing on-demand-type media content may be integrated into any suitable media program guide that represents information about scheduled-type media content and a transmission schedule for the scheduled-type media content in accordance with principles described herein.

Figure 13:
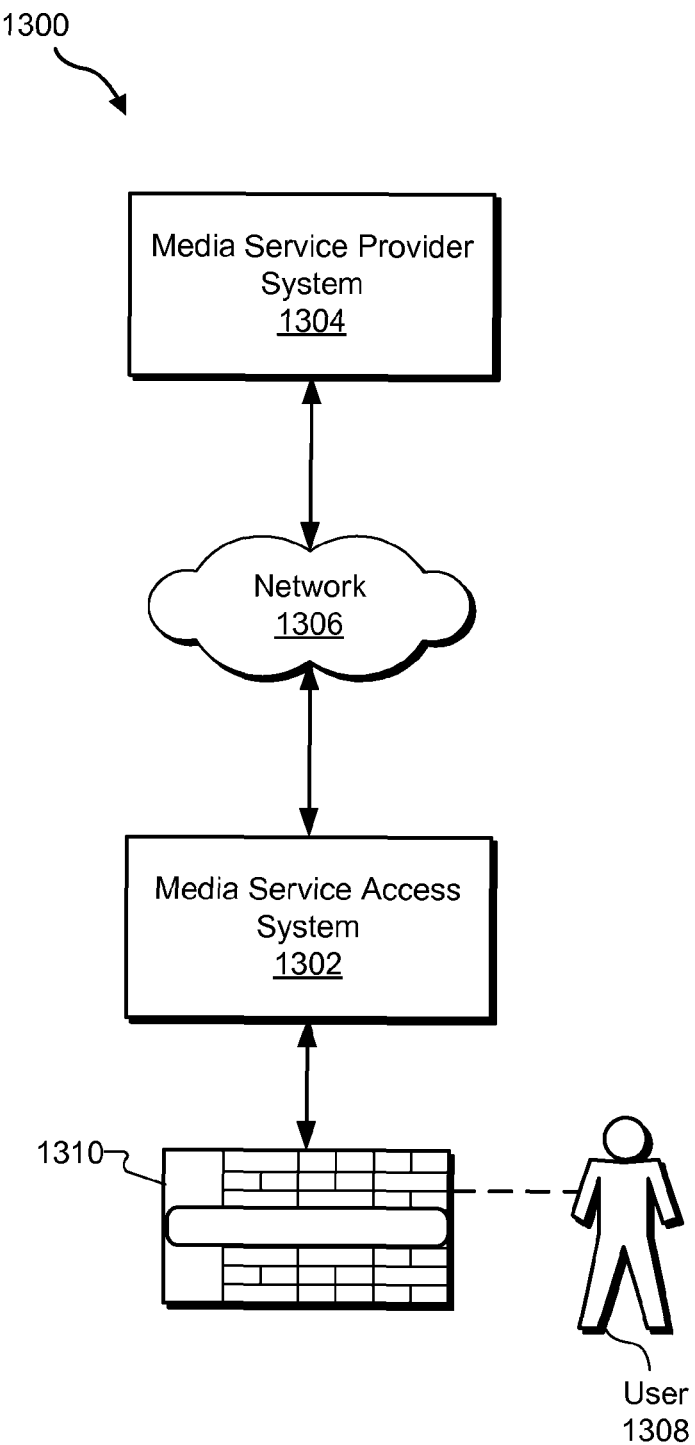
FIG. 13 illustrates an exemplary implementation of the system of FIG. 1 according to principles described herein.

System 100 may be implemented as may suit a particular application. FIG. 13 illustrates an exemplary implementation 1300 of system 100. As shown in FIG. 13, implementation 1300 may include media service access system 1302 configured to communicate with a media service provider system 1304 ("media service provider system 1304") by way of a network 1306. In implementation 1300, any of facilities 102-104 of system 100 may be implemented by access media service access system 1302, media service provider system 1304, or distributed across access media service access system 1302 and media service provider system 1304.

Media service provider system 1304 and media service access system 1302 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, subscriber and/or proprietary television network communication technologies, and other suitable communications technologies.

Network 1306 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between media service access system 1302 and media service provider system 1304. Communications between media service access system 1302 and media service provider system 1304 may be transported using any one of the above-listed networks, or any combination or sub-combination of the above-listed networks. Alternatively, media service access system 1302 and media service provider system 1304 may communicate in another way such as by one or more direct connections between media service access system 1302 and media service provider system 1304.

Media service provider system 1304 may include one or more server-side computing devices. Media service access system 1302 may include one or more media content processing devices (e.g., a set-top-box device, DVR device, television, gaming console, personal media player, media server, home media network gateway device, tablet computer, mobile device, etc.) capable of accessing and presenting media content for experiencing by a user 1308 (e.g., an end user of a media service) using the device(s).

Media service provider system 1304 and/or media service access system 1302 may be configured to perform one or more operations to provide a media program guide user interface 1310 for display and use by user 1308. Media program guide user interface 1310 may be displayed on any suitable display screen accessible to user 1308, including on a display screen of a display device included in media service access system 1302 or communicatively connected to media service access system 1302.

Figure 14:
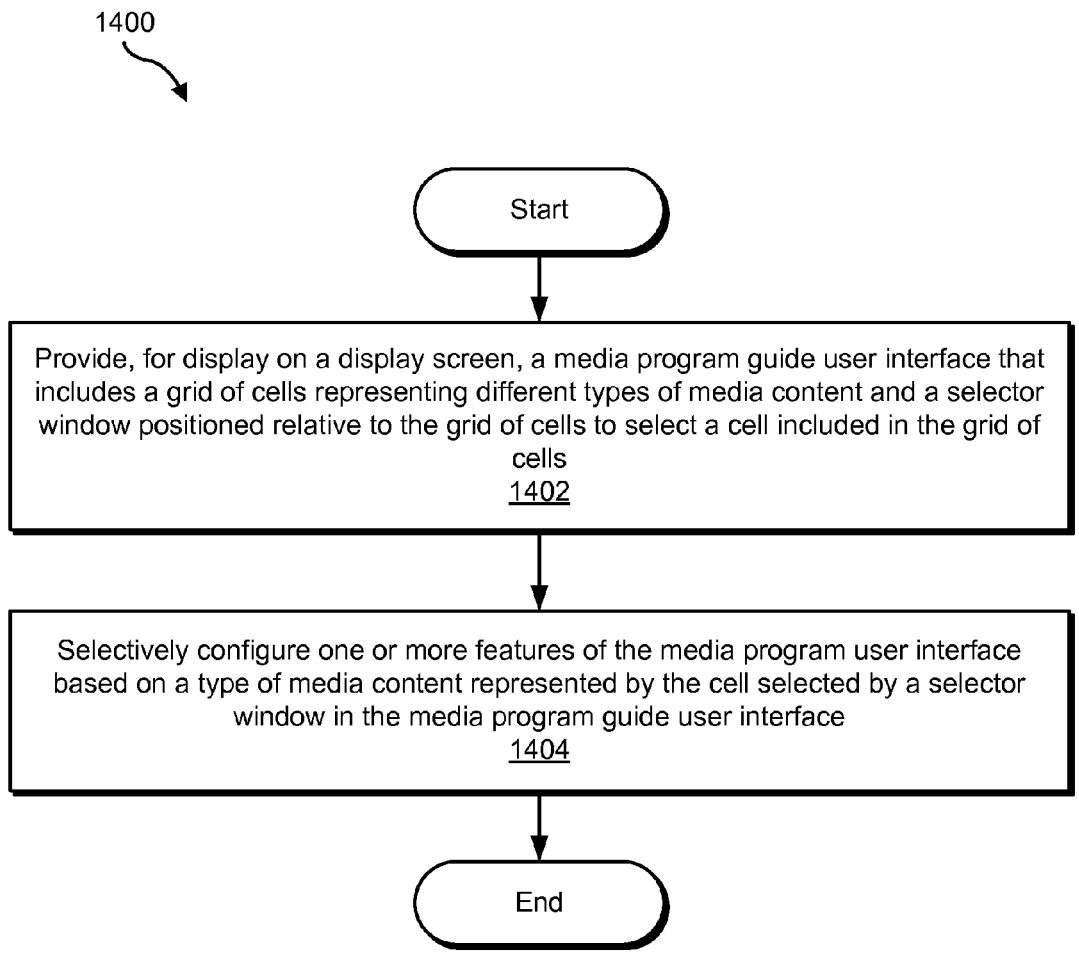
FIG. 14-15 illustrate exemplary unified media program guide methods according to principles described herein.
Figure 15:
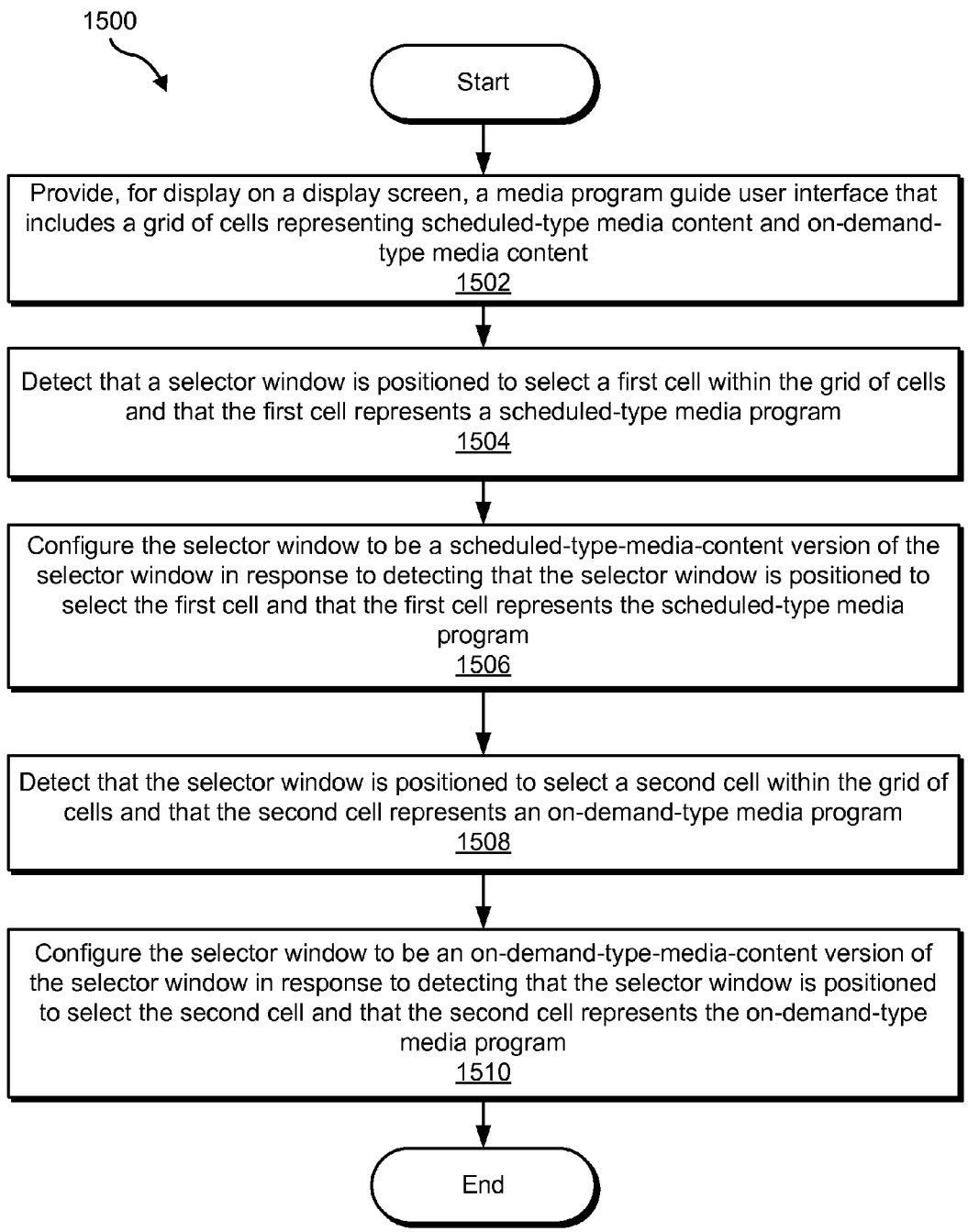

FIGS. 14-15 illustrate exemplary unified media program guide methods 1400-1500 according to principles described herein. While FIGS. 14-15 illustrate exemplary steps according to certain embodiments, other embodiments may omit, add to, reorder, combine, and/or modify any of the steps shown in FIGS. 14-15. In certain embodiments, one or more of the steps shown in FIGS. 14-15 may be performed by system 100 and/or one or more components or implementations of system 100.

Turning to the method 1400 illustrated in FIG. 14, in step 1402, a system (e.g., system 100) provides, for display on a display screen, a media program guide user interface that includes a grid of cells representing different types of media content and a selector window positioned relative to the grid of cells to select a cell included in the grid of cells, such as described herein. For example, the media program guide user interface may represent both scheduled-type media content and on-demand-type media content, such as described herein.

In step 1404, the system selectively configures one or more features of the media program user interface based on a type of media content represented by the cell selected by a selector window in the media program guide user interface, such as described herein.

Turning to the method 1500 illustrated in FIG. 15, in step 1502, a system (e.g., system 100) provides, for display on a display screen, a media program guide user interface that includes a grid of cells representing scheduled-type media content and on-demand-type media content, such as described herein.

In step 1504, the system detects that a selector window is positioned to select a first cell within the grid of cells and that the first cell represents a scheduled-type media program, such as described herein.

In step 1506, the system configures the selector window to be a scheduled-type-media-content version of the selector window in response to detecting that the selector window is positioned to select the first cell and that the first cell represents the scheduled-type media program, such as described herein.

In step 1508, the system detects that the selector window is positioned (e.g., repositioned) to select a second cell within the grid of cells and that the second cell represents an on-demand-type media program, such as described herein.

In step 1510, the system configures the selector window to be an on-demand-type-media-content version of the selector window in response to detecting that the selector window is positioned (e.g., repositioned) to select the second cell and that the second cell represents the on-demand-type media program, such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
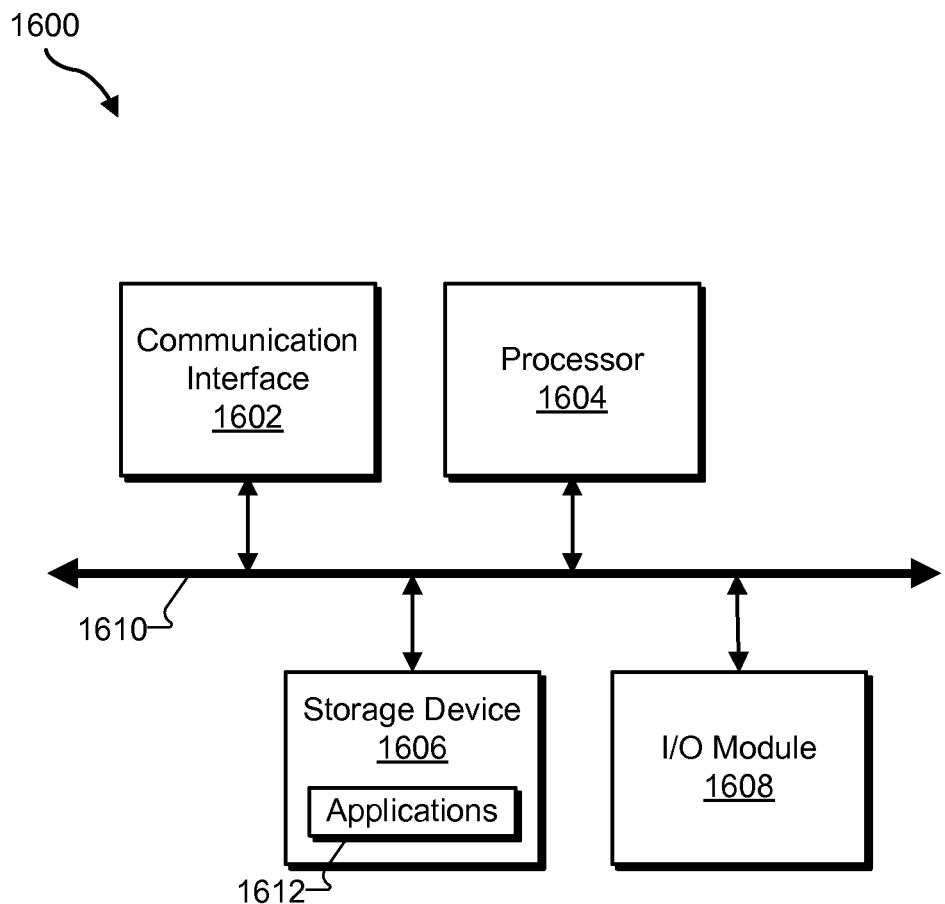
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a communications medium interface, a modem, and any other suitable interface. Communication interface 1602 may be configured to interface with any suitable communication media, protocols, and formats, including any of those mentioned above.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, system 100 or one or more components of system 100 are implemented by or within one or more components of computing device 1600. For example, one or more applications 1612 residing within storage device 1606 may be configured to direct processor 1604 to perform one or more processes or functions associated with program guide facility 102. Likewise, storage facility 104 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media program guide system for display on a display screen associated with a user computing device, a media program guide user interface that includes
a single grid of cells representing scheduled-type media content and on-demand-type media content, the single grid of cells including a first row that represents the scheduled-type media content, a second row that is positioned beneath the first row and that represents the on-demand-type media content, and a third row that is positioned beneath the second row and that represents the scheduled-type media content, and
a selector window that selects, based on a user interaction with the media program guide user interface, a single cell included in the single grid of cells; and
selectively configuring, by the media program guide system, a feature of the selector window based on whether the single cell selected by the selector window represents the scheduled-type media content or the on-demand-type media content, the selector window extending across one of the first row, the second row, and the third row in the single grid of cells such that the selector window covers the single cell selected by the selector window and any other cells included in the one of the first row, the second row, and the third row together with the single cell selected by the selector window, wherein:

the selector window and the single grid of cells are movable with respect to one another based on the user interaction with the media program guide user interface to select the single cell in the one of the first row, the second row, and the third row; and based on the user interaction with the media program guide user interface, the single cell selected by the selector window is spatially expanded in a vertical direction within the selectively configured selector window of the media program guide user interface provided for display on the display screen associated with the user computing device as compared to another cell included in the single grid of cells that has not been selected.

2. The method of claim 1, wherein the selectively configuring of the feature of the selector window comprises:
including, within the selector window, selector window content representing a time axis associated with a transmission schedule for the scheduled-type media content when the selected single cell represents the scheduled-type media content; and
omitting, from the selector window, the selector window content representing the time axis associated with the transmission schedule for the scheduled-type media content when the selected single cell represents the on-demand-type media content.

3. The method of claim 1, wherein the selectively configuring of the feature of the selector window comprises:
including, within the selector window, selector window content indicating a present time when the selected single cell represents the scheduled-type media content; and
omitting, from the selector window, the selector window content indicating the present time when the selected single cell represents the on-demand-type media content.

4. The method of claim 1, wherein the selectively configuring of the feature of the selector window comprises including, within the selector window, a media program browse carousel when the selected single cell represents a collection of on-demand-type media programs, the media program browse carousel including a plurality of individually selectable objects representing on-demand media programs included in the collection of on-demand-type media programs.

5. The method of claim 4, wherein the media program browse carousel comprises a bookend menu option selectable by a user to access a media-on-demand user interface.

6. The method of claim 4, wherein the plurality of individually selectable objects included in the media program browse carousel comprise a menu of cover art images representing on-demand-type media programs included in the collection of on-demand-type media programs, each of the cover art images selectable by a user to access a different one of the on-demand-type media programs included in the collection of on-demand-type media programs.

7. The method of claim 6, wherein the media program browse carousel further comprises a selector object movable by a user to select one of the cover art images included in the menu of cover art images.

8. The method of claim 7, wherein:
the selector object is positioned to select a cover art image included in the menu of cover art images; and
information about an on-demand-type media program included in the collection of on-demand-type media programs and represented by the cover art image selected by the selector object is presented within the selector object.

9. The method of claim 4, wherein:
the plurality of individually selectable objects included in the media program browse carousel comprise a scrollable menu of cover art images representing on-demand-type media programs included in the collection of on-demand-type media programs, the menu of cover art images bookended by a first bookend menu object at one end of the menu of cover art images and by a second bookend menu object at another end of the menu of cover art images; and
the first bookend menu object and the second bookend menu object are each selectable by a user to access a media-on-demand user interface.

10. The method of claim 1, wherein the cells in the single grid of cells are positioned in a two-dimensional matrix grid relative to a horizontal time axis and a vertical programming channel axis to represent a transmission schedule for the scheduled-type media content.

11. The method of claim 1, embodied as computer-executable instructions on at least one non-transitory computer-readable medium.

12. The method of claim 1, wherein a portion of the single cell selected by the selector window is further spatially expanded in a horizontal direction such that the portion of the single cell that is spatially expanded in the horizontal direction extends below at least one cell included in the single grid of cells that is directly horizontally adjacent to the single cell selected by the selector window.

13. A method comprising:
providing, by a media program guide system for display on a display screen associated with a user computing device, a media program guide user interface that includes
a single grid of cells representing scheduled-type media content and on-demand-type media content, the single grid of cells including a first row that represents the scheduled-type media content, a second row that is positioned beneath the first row and that represents the on-demand-type media content, and a third row that is positioned beneath the second row and that represents the scheduled-type media content, and
a selector window that selects, based on a user interaction with the media program guide user interface, a single cell included in the single grid of cells, the selector window and the single grid of cells movable with respect to one another based on the user interaction with the media program guide user interface to select the single cell in the one of the first row, the second row, and the third row;

detecting, by the media program guide system, that the selector window is positioned with respect to one of the first row and the third row to select a first cell within the single grid of cells and that the first cell represents a scheduled-type media program;

configuring, by the media program guide system, the selector window to be a scheduled-type-media-content version of the selector window in response to the detecting that the selector window is positioned to select the first cell and that the first cell represents the scheduled-type media program, the scheduled-type-media-content version of the selector window extending across the one of the first row and the third row in the single grid of cells such that the scheduled-typemedia-content version of the selector window covers the first cell selected by the selector window and one or more other cells included in the one of the first row and the third row together with the first cell selected by the selector window, the first cell selected by the selector window spatially expanded in a vertical direction within the configured selector window of the media program guide user interface provided for display on the display screen associated with the user computing device based on the user interaction with the media program guide user interface as compared to another cell included in the single grid of cells that has not been selected;

detecting, by the media program guide system, that the selector window is positioned to select a second cell within the second row in the single grid of cells and that the second cell represents at least one on-demand-type media program; and configuring, by the media program guide system, the selector window to be an on-demand-type media content version of the selector window in response to the detecting that the selector window is positioned to select the second cell and that the second cell represents the at least one on-demand-type media program.

14. The method of claim 13, wherein:
the configuring of the selector window to be the scheduled-type-media-content version of the selector window comprises including, within the selector window, selector window content representing a time axis associated with a transmission schedule for the scheduled-type media content; and
the configuring of the selector window to be the on-demand-type media content version of the selector window comprises omitting, from the selector window, the selector window content representing the time axis associated with the transmission schedule for the scheduled-type media content.

15. The method of claim 13, wherein:
the configuring of the selector window to be the scheduled-type-media-content version of the selector window comprises including, within the selector window, selector window content indicating a present time; and
the configuring of the selector window to be the on-demand-type media content version of the selector window comprises omitting, from the selector window, the selector window content indicating the present time.

16. The method of claim 13, wherein the configuring of the selector window to be the on-demand-type media content version of the selector window comprises including, within the selector window, a media program browse carousel when the selected second cell represents a collection of on-demand-type media programs.

17. The method of claim 16, wherein:
the media program browse carousel comprises a scrollable menu of cover art images representing on-demand-type media programs included in the collection of on-demand-type media programs, the menu of cover art images bookended by a first bookend menu object at one end of the menu of cover art images and by a second bookend menu object at another end of the menu of cover art images; and
the first bookend menu object and the second bookend menu object are each selectable by a user to access a media-on-demand user interface.

18. The method of claim 13, wherein the cells in the single grid of cells are positioned in a two-dimensional matrix grid relative to a horizontal time axis and a vertical programming channel axis to represent a transmission schedule for the scheduled-type media content.

19. The method of claim 13, embodied as computer-executable instructions on at least one non-transitory computer-readable medium.

20. A system comprising:
at least one processor; and
a non-transitory computer-readable medium storing instructions that, when executed by the at least one processor, cause the at least one processor to direct a media program guide user interface facility to:
provide, for display on a display screen associated with a user computing device, a media program guide user interface that includes
a single grid of cells representing scheduled-type media content and on-demand-type media content, the single grid of cells including a first row that represents the scheduled-type media content, a second row that is positioned beneath the first row and that represents the on-demand-type media content, and a third row that is positioned beneath the second row and that represents the scheduled-type media content, and
a selector window that selects, based on a user interaction with the media program guide user interface, a single cell included in the single grid of cells; and
selectively configure a feature of the selector window based on whether the single cell selected by the selector window represents the scheduled-type media content or the on-demand-type media content, the selector window extending across a row in the single grid of cells such that the selector window covers the single cell selected by the selector window and any other cells included in one of the first row, the second row, and the third row together with the single cell selected by the selector window, wherein:
the selector window and the single grid of cells are movable with respect to one another based on the user interaction with the media program guide user interface to select the single cell in the one of the first row, the second row, and the third row; and
based on the user interaction with the media program guide user interface, the single cell selected by the selector window is spatially expanded in a vertical direction within the selectively configured selector window of the media program guide user interface provided for display on the display screen associated with the user computing device as compared to another cell included in the single grid of cells that has not been selected.

21. The system of claim 20, wherein the at least one processor directs the media program guide user interface facility to selectively configure the feature of the selector window by:
including, within the selector window, selector window content representing a time axis associated with a transmission schedule for the scheduled-type media content when the selected single cell represents the scheduled-type media content; and
omitting, from the selector window, the selector window content representing the time axis associated with the transmission schedule for the scheduled-type media content when the selected single cell represents the on-demand-type media content.

22. The system of claim 20, wherein the at least one processor directs the media program guide user interface facility to selectively configure the feature of the selector window by including, within the selector window, a media program browse carousel when the selected single cell represents a collection of on-demand-type media programs.

23. The system of claim 20, wherein the cells in the single grid of cells are positioned in a two-dimensional matrix grid relative to a horizontal time axis and a vertical programming channel axis to represent a transmission schedule for the scheduled-type media content.

* * * * *